United States Patent [19]

Shimomura et al.

[11] 4,284,347

[45] Aug. 18, 1981

[54] APERTURE-CONTROLLING DEVICE IN A VARIABLE-SCALE PHOTOCOPYING MACHINE

[75] Inventors: Shozo Shimomura, Yokohama; Tadaaki Kanno, Yokosuka, both of Japan

[73] Assignee: Ricoh Co., Ltd., Tokyo, Japan

[21] Appl. No.: 109,316

[22] Filed: Jan. 3, 1980

[30] Foreign Application Priority Data

Jan. 30, 1979 [JP] Japan .................................. 54/9547

[51] Int. Cl.[3] ............................................ G03B 27/72

[52] U.S. Cl. ...................................... 355/71; 354/273; 355/61

[58] Field of Search .................. 355/14 E, 59, 61, 71; 354/273

[56] References Cited

U.S. PATENT DOCUMENTS

| | | | |
|---|---|---|---|
| 2,900,869 | 8/1959 | Bjelland et al. | 355/61 |
| 3,211,053 | 10/1965 | Wanielista et al. | 355/59 |
| 3,408,145 | 10/1968 | Walzberg | 355/59 |
| 3,618,502 | 11/1971 | Congrove | 355/61 X |

*Primary Examiner*—Richard A. Wintercorn

*Attorney, Agent, or Firm*—Oblon, Fisher, Spivak, McClelland & Maier

[57] ABSTRACT

In a variable-scale photocopying machine having a photosensitive medium, a light source, an optical system for projecting light from the source as an exposure light beam onto the medium, and a scale-varying mechanism, the width of the light beam is adjustable by an adjusting mechanism, which is actuated by a tensioned cord connected thereto when the cord is deflected by an adjusting member in response to movement of the scale-varying mechanism thereby to adjust the quantity of the exposure light to suit each scale of photocopying.

5 Claims, 3 Drawing Figures

APERTURE-CONTROLLING DEVICE IN A VARIABLE-SCALE PHOTOCOPYING MACHINE

BACKGROUND OF THE INVENTION

This invention relates generally to variable-scale photocopying machines of the type in which the scale of the size of a photocopy relative to that of its original can be varied thereby to obtain an enlarged or reduced copy of the original. More particularly, the invention relates to an aperture-controlling device for controlling, in accordance with the scale of the photocopying, the quantity of the photocopying exposure light projected onto the photosensitive medium in a variable-scale photocopying machine.

In a variable-scale photocopying machine of the character referred to above, the rotational speed of the drum bearing the photosensitive medium is the same for enlargement and for reduction. At the time of reduction, however, whereas the quantity of light per unit area of exposure increases because the size of the projected image is reduced by changing the lens or otherwise changing the lens focus, the quantity of light decreases since the scanning speed increases. Furthermore, because of deviations in the transmittance of the lens system, the reflectivity of the mirror, and the lens angle of view from machine to machine of the same type, the quantity of light projected onto the photosensitive drum tends to deviate from the optimum light quantity. These problems are encountered also at the time of enlargement.

SUMMARY OF THE INVENTION

It is an object of this invention to provide an aperture-controlling device in a variable-scale photocopying machine for controlling the quantity of light projected on the photosensitive medium so that the most suitable quantity of light is always thus projected even when the scale of photocopying is varied.

According to this invention, briefly summarized, there is provided an aperture-controlling device as stated above which comprises: a first mechanism for adjusting the width of the exposure light beam; a flexible filament structure under tension connected at one end of a span thereof to the mechanism for adjusting actuation thereof; an adjusting member engaging the filament structure and being movable in opposite first and second directions to adjustably deflect the structure at said span thereby to adjustably actuate the mechanism; a stationary stop against which the adjusting member is biased in the first direction by first biasing means in response to the operation of a scale-varying mechanism of the photocopying machine, the first mechanism then being normally in an equal-scale position; and an adjustable stop which is positionally adjustable according to a photocopying scale other than equal scale, and against which the adjusting member is biased by second biasing means in response to the operation of the scale-varying mechanism, the first mechanism then being in adjusted position for said photocopying scale.

The nature, utility, and further features of this invention will be more clearly apparent from the following detailed description with respect to preferred embodiments of the invention when read in conjunction with the accompanying drawing briefly described below.

DETAILED DESCRIPTION OF THE INVENTION

Figure 1:
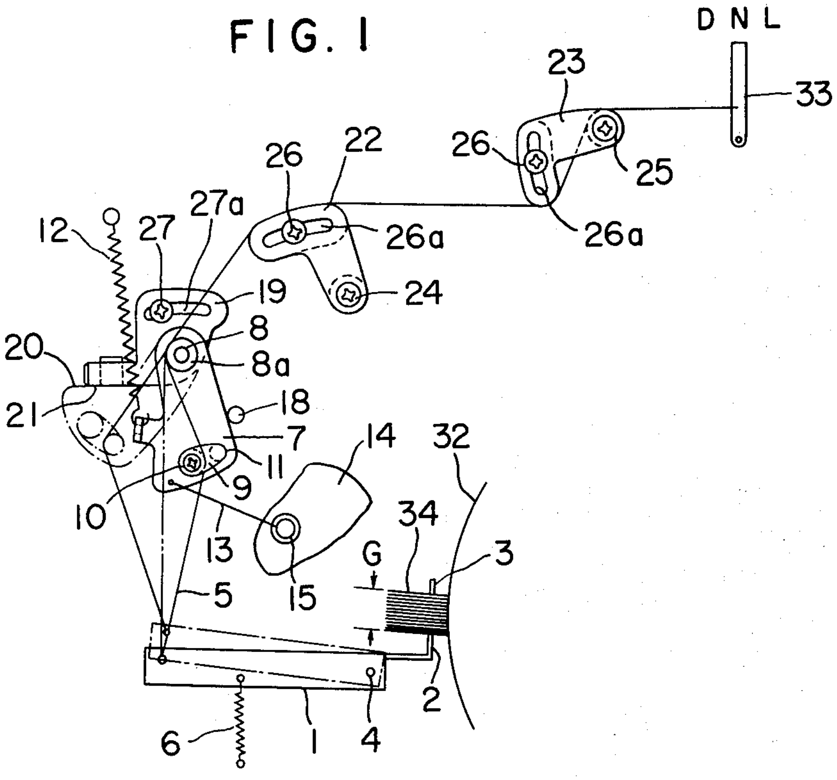
FIG. 1 is a schematic side view showing one example of the aperture-controlling device according to this invention in a variable-scale photocopying machine.

Referring first to FIG. 1 showing one example of the aperture-controlling device according to this invention in a variable-scale photocopying machine, a light beam 34 supplied from a light source (not shown) through an optical system (also not shown) is projected onto a photosensitive drum 32, a desired portion of which is thereby exposed to the light beam 34. The width of this light beam 34 immediately in front of the drum 32 is adjustably determined by the gap G between a stationary aperture member 3 and a movable aperture member 2, which is fixed to one end of an aperture-adjusting lever 1 to constitute one arm thereof. The lever 1 is pivotally supported near the same end thereof by a pivot pin 4. This lever 1 and the aperture members 2 and 3 constitute an aperture-adjusting mechanism in which pivotal displacements of the lever 1 cause corresponding displacements of the movable aperture member 2 thereby to vary the gap G and, therefore, the width of the light beam 34.

To the other end of the aperture-adjusting lever 1 is secured one end of an aperture string or cord 5, which is one example of the aforementioned flexible filament structure. The other end of the cord 5 is secured to an intermediate part of an exposure light-adjusting lever 33, by which the cord 5 can be adjustably displaced in its longitudinal direction. A coil spring 6 under tension is secured at its one end to the aperture-adjusting lever 1 and continually urges the lever to turn away from the cord 5, that is, counterclockwise as viewed in FIG. 1, whereby a tension is applied to the cord 5.

From the point of its attachment to the aperture-adjusting lever 1 to that to the exposure light-adjusting lever 33, the cord 5 is passed through a cord guide 9, partly around a collar 8*a*, and around equal-scale adjustment guides 22 and 23.

The cord guide 9 comprises a pair of projections 10 and 11 mounted in mutually spaced apart positions on an aperture-adjusting member 7 near the free end of the member 7, which is swingably pivoted at its other end by a pivot shaft 8. Around this pivot shaft 8 is fitted the above mentioned collar 8*a*. Swinging displacements of the aperture-adjusting member 7 cause the span of the cord 5 between the lever 1 and the collar 8*a* at its point of contact with the cord guide 9 to be deflected or displaced laterally and deviate from the straight line extending from the point of attachment of the cord 5 to the lever 1 to a point of tangency of that cord span relative to the collar 8*a*.

Figure 2:
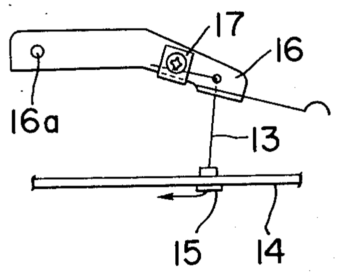
FIG. 2 is a plan view of a part of the device shown in FIG. 1.

The aperture-adjusting member 7 is urged to rotate in the clockwise direction as viewed in FIG. 1 by a tensioned coil spring 12. Countering this spring force is the tension of an auxiliary aperture cord 13, which is secured at one end thereof to the free end of the member 7 and is imparting a counter reactionary force in the counterclockwise direction to the member 7. This auxiliary string 13 is passed through a guide ring 15 fitted in a hole in a side plate 14 and is secured at its other end to an auxiliary lever 16 by an angle member 17 as shown in FIG. 2. This auxiliary lever 16 functions to cause a mirror (not shown) of the optical system of the photocopying machine to undergo displacement in accordance with the desired scale of photocopying and is urged to rotate in the counterclockwise direction as viewed in FIG. 2 about its pivot 16*a* by a spring (not shown). The auxiliary lever 16 in this example is thus a part of the scale-varying mechanism, which part is intercoupled to the aperture-controlling device of the invention.

The spring force of the above mentioned spring is made greater than the spring force of the above-mentioned coil spring 12. As a consequence, the auxiliary cord 13 is pulled by the auxiliary lever 16, and the aperture-adjusting member 7 is normally rotated counterclockwise as viewed in FIG. 1, overcoming the counter force of the coil spring 12. This counterclockwise rotation of the member 7 is limited by a stop 18 for equal-scale photocopying. When the scale of photocopying is to be changed, the auxiliary lever 16 is rotated through a specific angle in the clockwise direction as viewed in FIG. 2 by a control action for changing the scale of photocopying, whereby the member 7 is rotated in the clockwise direction as viewed in FIG. 1 by the force of the coil spring 12.

A stop member 19 for scale change is pivotally supported by the aforementioned pivot shaft 8. This stop member 19 has an engagement surface 21 for contact engagement with an engagement surface 20 of the aperture-adjusting member 7, which is thereby stopped at a specific angular position after rotating in the clockwise direction. The stop member 19 has an arcuate slot 27*a* through which a locking screw 27 is passed and tightened to lock the stop member 19 in any desired angular position. By loosening this screw 27, the stop member 19 can be adjustably reset. Thus, when the photocopying scale is changed, the stopping position of the aperture-adjusting member 7 can be so varied as to obtain a suitable quantity of light exposure. This adjustment is made after measuring the light quantity of each photocopying machine. The suitable stopping position is described more fully hereinafter.

As mentioned briefly hereinbefore, the aperture cord 5 is passed partially around the equal-scale adjustment guides 22 and 23 as shown in FIG. 1. These adjustment guides 22 and 23 are respectively pivotally supported on pivot pins 24 and 25 for rotational adjustment and respectively have arcuate slots 26*a*, 26*a* through which locking screws 26, 26 are passed and tightened for locking these guides 22 and 23 in adjusted positions. These equal-scale adjustment guides 22 and 23 are so adjusted that, when the aperture-adjusting member 7 is in contact with the stop 18 for equal-scale photocopying, the aperture adjusting lever 1 is in an angular position such that the width of the light beam 34 corresponds to the exposure light quantity suitable for equal-scale photocopying.

The aperture-controlling device of the above described construction is operated and functions in the following manner.

At the time of equal-scale photocopying, the auxiliary lever 16 is being urged to rotate in the counterclockwise direction as viewed in FIG. 2 by a coil spring (not shown). For this reason, the auxiliary cord 13 is under a tension such as to overcome the torque due to the spring 12, and the aperture-adjusting member 7 is pressed against and stopped by the equal-scale stop 18. Since the cord 5 at this time has been so adjusted as mentioned above by the equal-scale adjustment guides 22 and 23 that the width of the light beam 34 corresponds to the suitable exposure light quantity for equal-scale photocopying, excellent equal-scale photocopying is afforded.

For varied scale photocopying, a scale-changing button (not shown) is pushed, whereupon the auxiliary lever 16 rotates clockwise as viewed in FIG. 2 through a specific angle. Consequently, the aperture-adjusting member 7 is released from the force urging it to rotate counterclockwise due to the auxiliary cord 13 and is rotated in the clockwise direction by the coil spring 12 until it contacts and is stopped by the scale-change stop member 19. As a consequence, the aperture cord 5 held by the cord guide 9 of the member 7 first gradually approaches a straight-line form from the equal-scale position indicated by solid line in FIG. 1, as the member 7 rotates, and thereby permits the aperture-adjusting lever 1 to rotate counterclockwise, whereby the movable aperture member 2, operating cooperatively with the stationary aperture member 3, constricts the aperture width of the light beam 34.

Then, in the case where the scale-change stop member 19 is adjusted to narrow the aperture width, the aperture-adjusting member 7 is stopped by this stop member 19 at a position before the cord 5 assumes the straight-line state indicated by the two-dot chain line in FIG. 1, and the aperture width of the light beam 34 is so set as to obtain an exposure light quantity suitable for the scale to which the stop member has been adjusted.

In the case where the scale-change stop member 19 is adjusted to a scale requiring a widened aperture width of the light beam 34, the aperture-adjusting member 7 is permitted to rotate further in the clockwise direction, and the cord 5 passes and moves beyond the straight-line state, this time assuming a reflexed state as indicated by single-dot chain line in FIG. 1. In this manner, the aperture width of the light beam 34 is so widened that a suitable exposure light quantity will be obtained. Then, at an angular position corresponding to this suitable exposure light quantity, the member 7 contacts and is stopped by the stop member 19.

Thus, the aperture width of the light beam 34 can be so adjusted as to obtain a suitable exposure light quantity for changed scale photocopying.

Then, when an equal-scale button is pushed for returning the operational mode of the machine to equal-scale photocopying, the auxiliary lever 16 is rotated counterclockwise as viewed in FIG. 2 by spring force. As a consequence, the auxiliary cord 13 rotates the aperture-adjusting member 7, overcoming the force of the coil spring 12, until the lever strikes against and is stopped by the equal-scale stop 18, and equal-scale photocopy becomes possible as described hereinabove.

Figure 3:
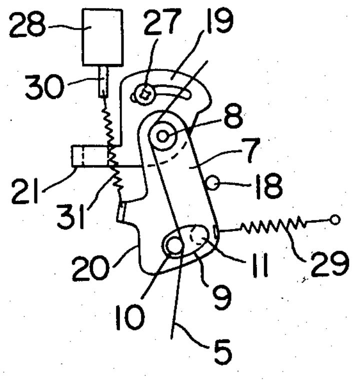
FIG. 3 is a schematic side view showing another example of an essential part of the aperture-controlling device of the invention.

In another embodiment of this invention as shown in FIG. 3, the rotational displacement of the aperture-adjusting member 7 is adjusted by the energization and deenergization of a solenoid 28. More specifically, the coil spring 12 of the preceding embodiment of the invention is replaced by a coil spring 31 secured at its one end to the member 7 and at its other end to the armature or plunger 30 of the solenoid 28. This coil spring 31 imparts a torque to the lever 7 urging it to rotate clockwise as viewed in FIG. 3. Counter to this torque, another coil spring 29 connected at its one end to the aperture-adjusting member 7 imparts a torque thereto urging it to rotate counterclockwise toward the equal-scale stop 18.

The spring forces of the coil springs 31 and 29 are so selected that the torque imparted by the coil spring 29 is greater than that imparted by the coil spring 31. Accordingly, the member 7 is normally pressed against the equal-scale stop 18. When the solenoid 28 is energized to retract the plunger 30, however, the torque applied by the coil spring 31 this time overcomes that applied by the coil spring 29, whereby the lever is brought into contact with the scale-change stop member 19. In this connection, the solenoid 28 is adapted to be energized only while the scale-change button (not shown) is being pressed. In other respects, the construction of this aperture-controlling device is the same as that of the above described preceding embodiment of the invention.

In the device of this construction, by setting the scale-change stop member 19 at the position for obtaining a suitable exposure light quantity for scale-change photocopying, the solenoid 28 is energized when the scale-change button (not shown) is pressed, and the coil spring 31 is pulled by the plunger 30. As a consequence, the lever is rotated clockwise until its surface 20 contacts and is stopped by the stop surface 21 of the scale-change stop member 19. Accordingly, the cord 5 is moved to set the aperture width at a value for passing a suitable exposure light quantity. At the time of equal-scale mode of photocopying, the solenoid 28 is deenergized, and the aperture-adjusting member 7 returns to its original position where it is in contact with the equal-scale stop 18. The solenoid 28 is operated interrelatedly with, or in response to, the operation of the aforementioned scale-varying mechanism of the optical system of the photocopying machine via an electrical system (not shown).

In the case where further aperture adjustment is necessary, this can be accomplished by moving the aforementioned exposure-adjusting lever 33, to the left from normal (N) as viewed in FIG. 1 for darker (D) exposure to narrow the aperture width or to the right for lighter (L) exposure to widen the aperture width.

As described above, the aperture-controlling device according to this invention in a variable-scale photocopying machine has a flexible filament structure stretched between an aperture-adjusting member and an aperture-adjusting lever for operating aperture members for adjustably varying the aperture width through which the exposure light beam is passed in accordance with the rotation of the aperture-adjusting member, means for urging the aperture-adjusting member toward a normal position, and a stop member for positional adjustment for stopping the aperture-adjusting member in rotation at a position corresponding to an aperture width set by the aperture members in accordance with the set scale of photocopying. With the structural organization of the parts according to this invention as described hereinabove, the flexible filament structure is actuated by the rotation from the normal position of the aperture-adjusting member to narrow or widen the aperture width and then to change to the opposite state. Therefore, the exposure light quantity for the photosensitive medium can be controlled in a simple manner in accordance with the selected scale of photocopying. Moreover, the adjustment is also simple since the aperture width can be easily controlled in either of the narrowing and widening directions.

What we claim is:

1. In a variable-scale photocopying machine having a photosensitive medium, a light source, and an optical system including a scale-varying mechanism for varying the photocopying scale and operating to project light from the light source as an exposure light beam onto the photosensitive medium, the combination therewith of an aperture-controlling device comprising:

an aperture-adjusting mechanism for adjusting the width of the exposure light beam;

a flexible filament structure in tensioned state connected at one end to the aperture-adjusting mechanism for adjusting actuation thereof and passed at an intermediate part thereof around a guide, whereby a span of the filament structure is formed between the aperture-adjusting mechanism and the guide;

an aperture-adjusting member engaging the filament member and being movable in opposite first and second directions to adjustably deflect the filament structure at a point of the span thereby to adjustably actuate the aperture-adjusting mechanism;

first biasing means for biasing the aperture-adjusting member in the first direction;

a stationary stop against which the aperture-adjusting member is biased by the first biasing means in response to the operation of the scale-varying mechanism, the aperture-adjusting mechanism then being normally in an equal-scale position;

second biasing means for biasing the aperture-adjusting member in the second direction; and an adjustable stop member which is positionally adjustable according to a photocopying scale other than equal scale, and against which the aperture-adjusting member is biased by the second biasing means in response to operation of the scale-varying mechanism, the aperture-adjusting mechanism then being in adjusted position for said photocopying scale.

2. An aperture-controlling device according to claim 1 in which the aperture-adjusting member is a lever structure pivotally supported at a pivoted end thereof and having a free end remote from the pivoted end and engaging the filament member, said free end thereby being swingably movable in the first and second directions.

3. An aperture-controlling device according to claim 1 in which the filament structure, after being passed around the guide is further passed around adjusting guides and secured at the other end thereof to an exposure light-adjusting lever, opposite movements of which actuate the filament structure longitudinally in opposite directions thereby to adjustably actuate the aperture-actuating mechanism.

4. An aperture-controlling device according to claim 1 in which the first and second biasing means respectively comprise springs.

5. An aperture-controlling device according to claim 1 in which the first biasing means comprises a spring, and the second biasing means comprises a solenoid having a plunger and operating in response to the operation of the scale-varying mechanism and a spring connected between the plunger and the aperture-adjusting member.

* * * * *